United States Patent [19]
LaCroix

[11] 4,372,640
[45] Feb. 8, 1983

[54] LINE MAKER WITH LASER SOURCE

[76] Inventor: Eugene F. LaCroix, 5611-240th SE., Woodinville, Wash. 98072

[21] Appl. No.: 246,389

[22] Filed: Mar. 23, 1981

[51] Int. Cl.³ .............................................. G02B 27/17
[52] U.S. Cl. .................................... 350/6.3; 350/484
[58] Field of Search ............... 350/6.3, 6.4, 6.1, 484; 250/236, 235, 231 SE; 356/399, 153, 144; 358/205; 219/121 LW, 121 LV, 121 LR, 121 LP, 121 LA; 362/259

[56] References Cited

U.S. PATENT DOCUMENTS 2,957,044  10/1960  Culder et al. ......................... 350/6.3
3,351,767  11/1967  Suiter ................................. 350/484
3,940,609  2/1976  Johnstun ............................. 250/236

FOREIGN PATENT DOCUMENTS 2241366  4/1973  Fed. Rep. of Germany ...... 356/172

*Primary Examiner*—Jon W. Henry
*Attorney, Agent, or Firm*—Cole, Jensen & Puntigam

[57] ABSTRACT

The cylindrical lens eccentrically mounted to a rotating shaft having a predetermined RPM for reciprocal movement in front of the laser beam generating and projecting a visually continuous line perpendicular to the axis of the cylindrical lens.

3 Claims, 5 Drawing Figures

LINE MAKER WITH LASER SOURCE

BACKGROUND OF THE INVENTION

Technological advances have greatly increased the productivity and accuracy of many industries including heavy industries such as sawmills, plywood factories, shipbuilding, construction and other industries where it is critical and essential that straight-lines be consistently maintained.

Historically, the straight-line in the aforementioned industries was maintained reasonably well by skilled craftsmen such as sawyers or the like but this was a painstaking, time-consuming operation. The advent of laser beams permitted automation of these necessarily accurate processes of such large industries since the laser beam could project an intense straight-line which could be detected by sensing devices such as photocells thus directing and controlling the machinery. In industries such as sawmills, plywood mills or the like, the object upon which the operation is being performed is continously moving and therefore, the laser beam must necessarily be placed in a position some distance from, and out of the direction of movement of the object being operated upon. Past attempts to project the laser beam on such objects therefore have been utilized lenses, mirrors or the like to "bend" the beam to the appropriate place of projection.

These prior art attempts have been reasonably successful, however, the utilization of lenses and mirrors has resulted in lines that are too dim to be easily seen and detected, too short to be effective, not sharp and clear enough to be easily followed either visually or automatically and when multifaced mirrors or the like have been used, the result has been moving dots or discrete short lines which have a hypnotic effect upon the viewer and therefore far less than desirable and overly fatiguing. What is desired is a straight-line which is projected upon an object in a manner whereat the line is of reasonable length, of consistent and constant brightness and of a length sufficient to cover the necessary operation. Further, the device generating the line must be located a safe distance from the object. The length of the line becomes critical in that if the length is achieved by moving the light source a great distance from the object thereby taking advantage of the smaller angle of projection, the line becomes dim and less sharp.

Because of its intensity and because of its other distinct characteristics, the laser beam has become the standard of the industry in applications requiring a guideline and therefore it became a problem of adapting the laser beam to meet the necessary requirements. As noted above, lenses have been used with laser beams and by utilizing the inherent characteristics of the lenses, it became apparent that a small diameter cylindrical lens lengthened the line, however, the line became less than bright because of the dispersion of light over the greater space.

The large diameter lens yields a brighter line but shorter and therefore this does not resolve the problem either. A plurality of lenses placed side-by-side with the laser scanning them results in a longer brighter line but because of the physical characteristics of the composite structure, the line is uneven in intensity and has distracting bright spots.

A possible solution then would be to move a cylindrical lens of a diameter greater than the beam itself in front of the beam at a rate which generates a visually acceptable long line.

Prior art devices which have utilized an optical device for projecting a line or electronically scan a device are known but the applicant is not aware of any prior use of a reciprocating cylindrical lens to increase the length of the line.

Prior art known to the inventor include U.S. Pat. No. 2,648,249 granted to Canada Aug. 11, 1953 which discloses the reciprocation of mirrors and other elements of an optical system to vary the wavelength of a monochromatic beam.

U.S. Pat. No. 3,317,735 granted to Elsasser discloses a concept of rotating a cylindrical lens to obtain line scanning of a film, the lens does not reciprocate.

U.S. Pat. No. 3,781,078 granted to Wildhaber, Dec. 25, 1973 discloses the concept of an optical scanner using a laser and a lens with a cylinder inner surface using the index of refraction as a varying prism to eliminate at any one instant a narrow line like projection.

U.S. Pat. No. 3,785,713 granted to Walles, Jan. 15, 1974 discloses that it is known to make an image scan in an image plane at right angles to the optical axis of the system.

U.S. Pat. No. 3,877,777 granted to Glenn, Apr. 15, 1975 discloses a beam expander system for a film scanner wherein cylindrical lenses 30 and 40 are employed. These cylindrical lenses do not reciprocate but are stationary.

U.S. Pat. No. 4,218,112 granted to Ruker, Aug. 19, 1980 discloses a concept of reciprocating a lens 4 in an optical system. This lens is not a cylindrical lens and it is used to scan small objects.

With the above noted prior art and problems in mind, it is an object of the present invention to provide a simple means for effectively and consistently projecting a bright well defined narrow line.

It is another object of the present invention to provide a means for reciprocating a cylindrical lens in front of a laser beam thereby projecting a visually continuous line of great length and acceptable intensity.

It is another object of the present invention to provide a structure for mounting a cylindrical lens for reciprocal motion in front of a laser beam wherein the particular location and thus relative movement of the lens may be accurately and easily adjusted.

Still a further object of the present invention is to provide a means for generating a long visually uniform line.

DETAILED DESCRIPTION OF THE DRAWINGS

Figure 1:
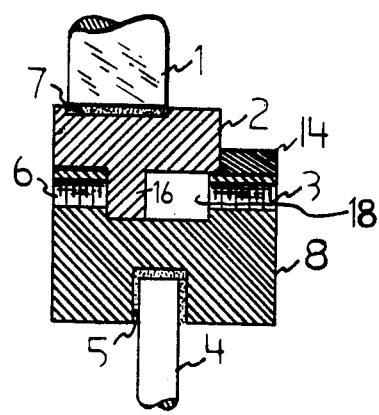
FIG. 1 is a vertical sectional view of the preferred embodiment of the mechanism used for generating a visually continuous line.

It is emphasized that the primary purpose of the present invention is to project a visually continuous line which is accomplished by reciprocating a cylindrical lens in front of a laser light source. The critical aspect of the present invention includes the cylindrical lens which is shown in FIG. 1 and designated by 1. The cylindrical lens is mounted with its end secured by epoxy or the like 7 to a disc 2 movably mounted within a horizontal slot 14 in a primary drive disc 8. Mounting disc 2 has a downwardly projecting tab 16 which is mounted within a depression 18 generally parallel to slot 14 and extending downwardly therefrom. A pair of threaded openings 3,6 extend from the exterior of the drive disc 8 to the slot 18 permitting the infinite adjustment of tab 16 within the slot 18. The adjustment permitted by the screws within opening 3 and 6 permit the movement of the mounting disc 2 and thus the mounted cylindrical lens 1 with relationship to the main disc 8. It is to be understood that the mounting of cylindrical lens 1 to mounting disc 2 is eccentrically placed and the screw adjustment is primarily fine tuning. Main disc 8 is secured by epoxy 5 or the like to a shaft 4 which is directly secured to the driving motor having a predetermined rate of rotation.

Figure 2:
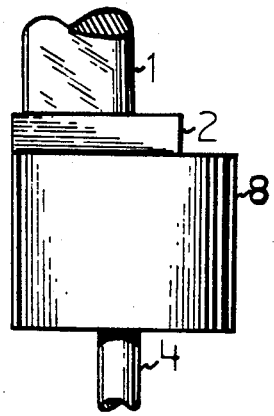
FIG. 2 is a vertical view of the invention of FIG. 1.
Figure 3:
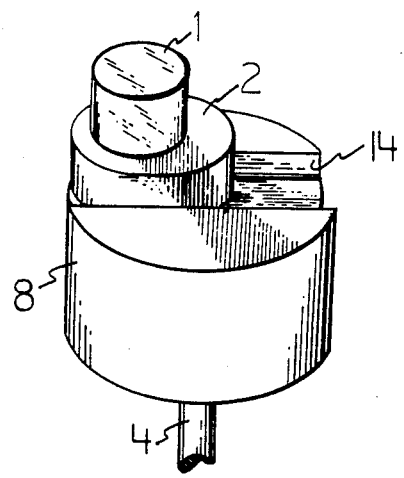
FIG. 3 is an isometric view of the invention of FIG. 1.

Referring now to FIGS. 2 and 3, it can be seen that the structure for mounting the cylindrical lens 1 is simple of construction, attractive and durable. The parts that are fixedly secured together are done so by any acceptable means including welding, epoxy or other devices whereas the adjustment or the placement of the axis of the cylindrical lens with respect to the axis of the rotation shaft 4 is accomplished in this simple efficient manner by means of the initial placement and the adjusting screws placed within the threaded openings 3,6.

Figure 4:
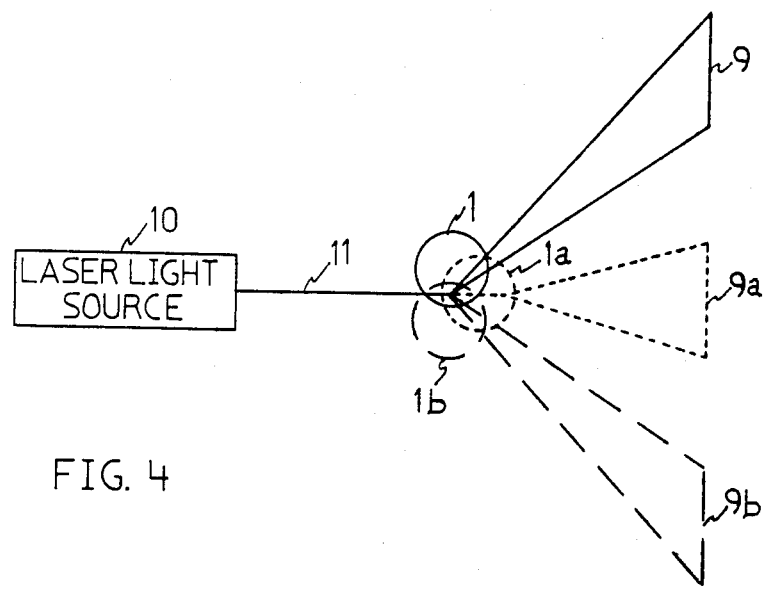
FIG. 4 is a schematic representation of the operation of the device in conjunction with a laser light source.
Figure 5:
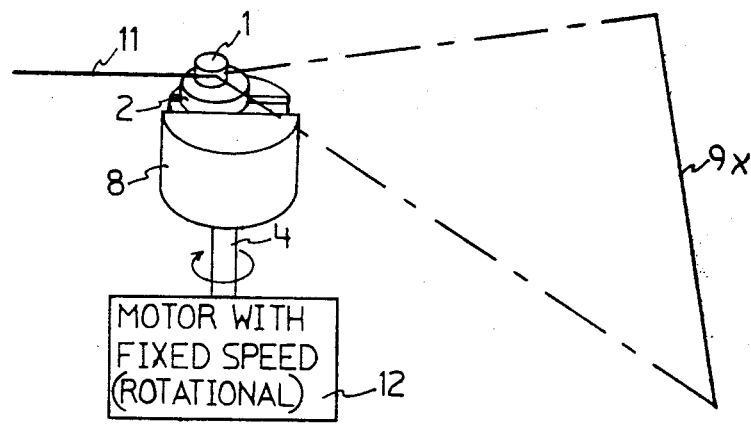
FIG. 5 is another partially schematic view of the present invention.

Referring now to FIG. 4, the basic concept behind the present invention may more readily be seen. As seen in this view, a cylindrical lens 1 is rotated through an infinite number of positions illustrated by positions 1a, 1b in front of a laser light source 10 projecting a laser beam 11. As a result of the lens being in a position 1, a line is projected as at 9 whereas a position 1a projects a line as at 9a in position 1b projects a line as at 9b. The rate of reciprocation of the lens 1 for the cylindrical light source causes the various segments 9a, 9b to merge into a single visually complete line. As seen in FIG. 5, the fixed speed motor to which shaft 4 is mounted causes the lens 1 to rotate on eccentric thereby generating the complete line 9x which is the total summation of line projected in the various positions i.e. $9x = 9 + 9a + 9b + 9c .. 9(n+1)$.

Thus, as can be seen the very simple elementary device the applicant is able to project a line of infinite length having the desired intensity and sharpness. To avoid the detection of motion, the rod must be rotated at a speed slightly greater than 720 RPM.

What is claimed is:

1. Means for drawing a visually continuous line upon a regularly replaced object such as a log or the like being cut into lumber comprising:

a fixed laser source an appropriate distance from the desired line display, a cylindrical lens mounted between the laser source and the desired line display, said cylindrical lens mounted to a rotating body with its axis perpendicular to the desired line display, and parallel to but non-colinear with the axis of rotation such that it oscillates through the laser beam to form a line of the desired length.

2. Line generating means as in claim 1 wherein the amount of non-collinearity of the two axes is adjustable.

3. Line generating means as in claim 1, wherein the minimum rotational speed is 800 revolutions per minute.

* * * * *